(No Model.) 2 Sheets—Sheet 1.
H. A. ROWLAND.
ELECTRICAL MEASURING INSTRUMENT.

No. 561,919. Patented June 9, 1896.

Witnesses
John H. Holt,
Brey C. Bowen.

Inventor
Henry A. Rowland,
by Whitman & Wilkinson,
Attorneys (No Model.) 2 Sheets—Sheet 2.

H. A. ROWLAND.
ELECTRICAL MEASURING INSTRUMENT.

No. 561,919. Patented June 9, 1896.

Witnesses
John H. Holt.
Percy C. Bowen.

Inventor
Henry A. Rowland,
by Whitman & Wilkinson,
Attorneys.

UNITED STATES PATENT OFFICE.

HENRY AUGUSTUS ROWLAND, OF BALTIMORE, MARYLAND.

ELECTRICAL MEASURING INSTRUMENT.

SPECIFICATION forming part of Letters Patent No. 561,919, dated June 9, 1896.

Application filed October 2, 1895. Serial No. 564,437. (No model.)

*To all whom it may concern:*

Be it known that I, HENRY AUGUSTUS ROWLAND, a citizen of the United States, residing at Baltimore city, in the State of Maryland, have invented certain new and useful Improvements in Electrical Measuring Instruments; and I do hereby declare the following to be a full, clear, and exact description of the invention, such as will enable others skilled in the art to which it appertains to make and use the same.

My present invention relates to improvements in methods of and instruments for making various electrical measurements; and the object of this invention is to make a more convenient and accurate system of instruments for the measurement of electrical currents of various strengths as well as various potentials.

One of the principal features of the invention is the providing of a wall instrument furnished with a telescope and scale or lamp and scale hinged to it and capable of being folded against the wall when not in use.

I attain the objects above stated by the arrangement illustrated in the accompanying drawings, in which—

Figure 2:
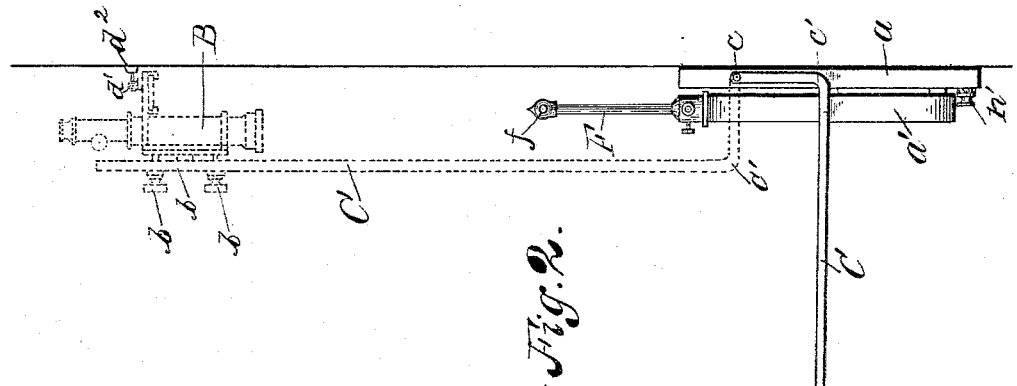
Figure 1:
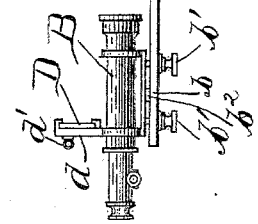
Figure 1:
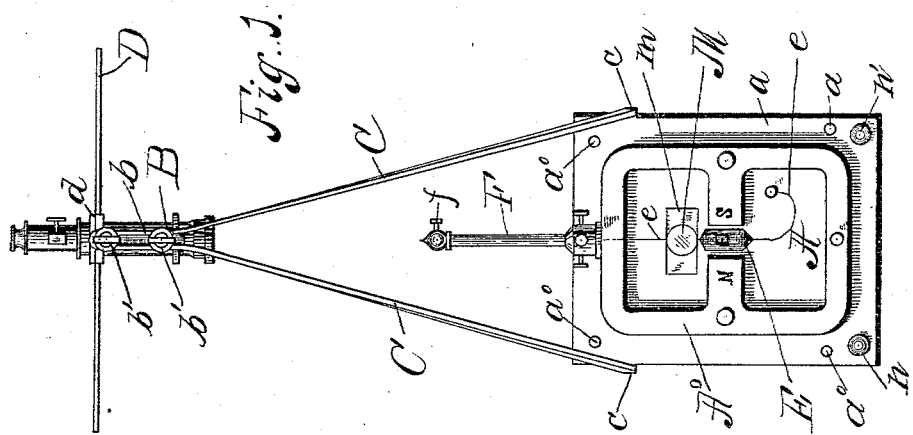
Figure 3:
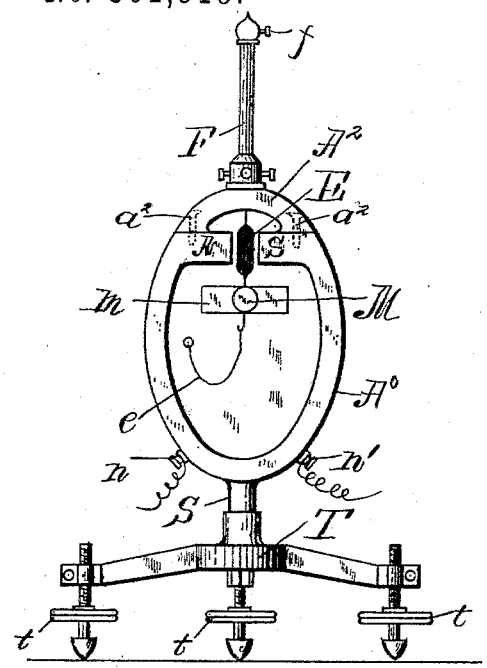
Figure 5:
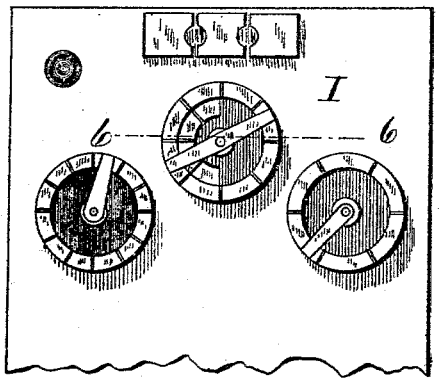
Figure 6:
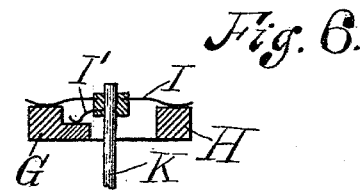
Figure 4:
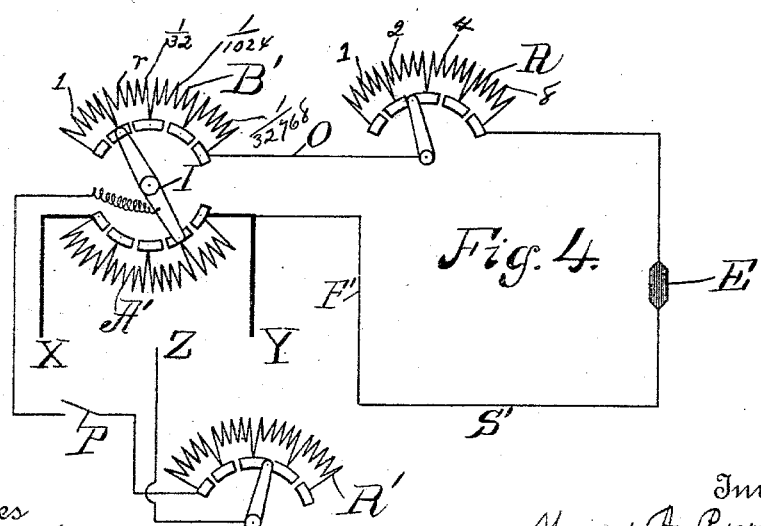

Figure 1 is a front elevation of my improved form of D'Arsonval galvanometer with telescope and scale mounted thereon, said telescope and scale being raised as in position when not in use. Fig. 2 is a side elevation of the same galvanometer, the frame carrying the telescope and scale being down as in position for reading the deflections on the scale, and in addition thereto is shown in dotted lines the support, telescope, and scale raised and hooked against the wall, to which wall the base of the galvanometer is also attached. Fig. 3 represents in front elevation a modified form of the D'Arsonval galvanometer shown in Figs. 1 and 2, this form being more especially adapted to rest upon a table or other horizontal plane. Fig. 4 is a diagram of the circuits of the currents to be measured, showing the arrangement of resistances for obtaining various shunt-valves. Fig. 5 represents in front elevation the contact-makers which are employed to throw in and out of the circuit such amounts of resistance as may be required for any particular measurement. Fig. 6 is a section through the line 6 6 of the contact-maker shown in Fig. 5.

Similar letters refer to similar parts throughout the several views.

A is a galvanometer of the D'Arsonval type constructed in a manner to render it particularly free from all vibrations, which is in a large degree accomplished by making the instrument readily attachable to the wall of a room or other object in a vertical plane.

The galvanometer A consists of a base $a$, to which is attached the other parts of the instrument, said base being provided with holes $a^0$, by means of which the same may be readily screwed or otherwise attached to a wall.

$A^0$ is an iron frame attached to the base $a$, which frame forms a magnetic field, and between the poles N S of which is suspended the coil E. In the form of frame shown in Fig. 1 the frame $A^0$ is shown as having a continuous periphery, while the frame shown in Fig. 3 has a cap $A^2$, secured to the top of the frame by screws $a^2$. This cap is of brass or other non-magnetic material. The upper or lower portion of the frame $A^0$ (shown in Fig. 1) may also be completed by a cap similar to that shown in Fig. 3, if desired. Besides forming a magnetic field the frame $A^0$ constitutes a box and support for other parts of the instrument.

The coil of fine wire E is suspended from the screw $f$, said screw affording a means for adjusting the position of the coil E.

F is a metallic tube through which passes the wire $e$. Just above the coil E and attached to the wire $e$ is the mirror M, directly behind which mirror and also attached to the wire $e$ is a mica vane $m$, the effect of which vane is to greatly facilitate damping, thereby rendering the instrument practically deadbeat. The arms C, upon which are carried the telescope and scale, are pivotally connected, as at $c$, to the sides of the base $a$ of the instrument. The arms C of the support converge and become parallel, as at $b$, thereby forming a slot through which pass the thumb-screws $b'$ of the telescope. By this arrangement the telescope may be readily detached from the frame.

Instead of having the arms C pivotally connected to the base of the instrument, as shown in the figures, one side may be hinged and the other provided with a catch, thus allowing the telescope and scale to be moved around to the right or left in a horizontal plane.

B is a reading-telescope attached to the support C by means of the thumb-screws $b'$, as above described. A slotted frame $d$ forms a convenient means of support for the scale D, which scale is adjustable either to right or left. As the small block $b^2$ forms a bearing under the center of the telescope-frame, it is readily seen that the eyepiece may be raised or lowered by adjusting the screws $b'$.

An eyelet $d'$, attached to the back of the frame $d$, engages a small hook $d^2$, by means of which arrangement the telescope frame and support are held vertically against the wall.

The essential difference between the galvanometers shown in Figs. 1 and 2 and that shown in Fig. 3 lies in the fact that the latter is provided with a tripod T, intended to stand upon a table or other horizontal plane, while the former is essentially a wall instrument.

The frame A', Fig. 3, is provided with a socket S.

By virtue of the socket-joint at S the galvanometer is capable of being revolved in any desired direction.

The tripod T is provided with the leveling-screws $t$.

The current to be measured, entering at the binding-post $n$, passes into the small wire $e$ above the coil, traverses the coil, and passes out at $n'$.

The angle of deflection which the mirror makes is of course proportional to the intensity of the current. The gradations on the scale D are reflected by the mirror into the telescope, where the amplitude of the angle of deflection is read.

While in this special case I have chosen the D'Arsonval type of galvanometers it can readily be seen that almost any form of reflecting-galvanometer could be used. For measuring current of various degrees of intensity I use in connection with the above-described galvanometer a system of shunts. This arrangement of shunts for reducing the current in a given series of ratios consists of three series of resistances, as seen at A' B' R, Fig. 4.

For measuring current, suppose the current enters at X, Fig. 4, passes through the series of resistances A' and out at Y. The current divides, a portion being shunted through the circuit B', O, R, E, S', and F', which circuit includes the set of resistances R and the set B', equal to A'. The arm I, moving over the resistance A', also moves over B', so that when the resistance A' is increased by a certain increment—say $r$—the shunt-circuit resistance is decreased by the same amount. From this arrangement the shunt value becomes $\frac{r}{R+r-r}=\frac{r}{R}$. The practical value of this idea is in the fact that if the series of resistances $r$ and R both change according to a geometrical progression, the shunt values will also form a geometrical progression which by the combination may be of immense extent. Thus if R have values 1, 2, 4, 8, 16, and the series 1, $\frac{1}{32}$, $\frac{1}{1024}$, $\frac{1}{32768}$, the inverse shunt ratios will be 1, 2, 4, 8, 16, 32, 64, 128, 256, 512, 1024, 2048, 4096, 8192, 16384, 32768, 65536, 131072, 262144, 524288. Thus out of nine resistances and four compensating coils I have obtained twenty shunt ratios. The special value of this arrangement is when heavy currents are to be measured, as, in this case, only the four resistances $r$ need be adapted to heavy currents, the other series $r$ and R being of fine wire. The range of shunt values is also immense.

The practical arrangement by which the main current is allowed to pass through only low resistance while a portion thereof is shunted through higher resistance and through the coil E, and by which arrangement when the resistance in the main current-circuit is increased by a certain increment—say $r$—and the shunt-resistance decreased by the same amount is shown in Fig. 6. The main current entering at K passes up the same rod through the contact-arm I' into the block G, G being a section through one of the segments shown at A' in Fig. 4, has interposed between it and the other segments suitable resistance through which the current passes, making its exit at Y. Now also upon the rod K, Fig. 6, is another contact-arm I, which is insulated from the rod K and makes contact with both the segments G and H. The current entering a portion thereof is shunted through the arm I into the shunt-resistances interposed between the contact-pieces, of which H is a section. Now it is clear that if the contact-arms I and I' are revolved in the same direction by equal amounts, as the resistance is increased in one circuit it will be decreased by the same amount in the other. This arrangement does not allow the resistance at the contact of the main current to cause any error.

The current which passes through the coil E is reduced to the shunt ratio, and by obtaining a very large number of shunt ratios from only nine resistances the great range of currents, from the strongest to the weakest, which can be measured by this method is at once evident.

For measuring potential the set of resistance-coils R' are added by closing the switch P, and thus the potential is gotten between Z and Y.

Although the instrument as herein described has been shown, for the sake of clearness, without a covering of glass, wood, or other material, it is readily seen that a box hinged to one side of the base of the galvanometer or glass cover provided with catches would exclude all drafts from the moving parts of the instrument.

Now as one of the advantages claimed for the wall-galvanometer herein described is its absolute freedom from shocks and vibrations, I have devised a method of support which will accomplish this object. This is done by making the support a combination of rigidity and friction. Thus in Fig. 1 the arm is supported by pivoting-screws, to which is added the friction of the arms grasping the base-board when it falls into position. The friction quickly dissipates the energy of vibration and brings the arm to rest. This arrangement of telescope and scale has the following advantages: The telescope and scale can be turned back on the wall and fixed by a hook whenever not needed, and can be lowered into position and perfect adjustment in a moment. Then, again, the wall is free from the vibrations of the floor and the floor-space is free to allow a table to be placed under the instrument for taking notes or supporting other instruments. The table may be hinged to the wall, if desired.

There are various other advantages of the herein-described construction which would readily suggest themselves to any one skilled in the art.

It will be obvious that various modifications might be made which could be used without departing from the spirit of my invention.

Having thus described my invention, what I claim, and desire to secure by Letters Patent of the United States, is—

1. The combination of an electrical measuring instrument, means for attaching the same to the wall, and a pivoted arm capable of folding against the wall, with a reading-scale carried by said arm, substantially as described.

2. The combination of an electrical measuring instrument, means for attaching the same to the wall, and a pivoted arm capable of folding against the wall, and a telescope and reading-scale attached to said arm, substantially as described.

3. The combination with a base suitable for attaching to the wall, of a pivoted arm with scale and telescope attached, and an electric measuring instrument mounted on said base, substantially as described.

4. The combination with an electric measuring instrument, of a pivoted arm carrying a reading-scale, and a shunt-box connected to the terminals of the instrument, substantially as and for the purposes described.

5. The combination of an electrical measuring instrument, means for attaching the same to the wall, a pivoted arm capable of folding against the wall, and having frictional contact with the base of the instrument when in the operative position and a reading-scale carried by same, substantially as described.

6. The combination of an electrical measuring instrument, means for attaching the same to the wall, a pivoted arm capable of folding against the wall, and having frictional contact with the base of the instrument when in the operative position, and a telescope and reading-scale attached to said arm, substantially as described.

7. The combination with a base suitable for attaching to the wall, of a pivoted arm with scale and telescope attached, the said arm having frictional contact with the base of the instrument, when in the operative position, and an electric measuring instrument mounted on said base, substantially as described.

8. The combination of an electrical measuring instrument, and means for attaching the same to the wall, of a pivoted arm capable of folding against the wall, with an adjustable reading-scale carried by said arm, substantially as described.

9. The combination of an electrical measuring instrument, and means for attaching the same to the wall, of a pivoted arm capable of folding against the wall, and a telescope and an adjustable reading-scale attached to said arm, substantially as described.

In testimony whereof I affix my signature in presence of two witnesses.

HENRY AUGUSTUS ROWLAND.

Witnesses:
JOHN E. BUNKER, Jr.,
HELEN M. SMITH.